(12) United States Patent
Goto

(10) Patent No.: US 8,783,946 B2
(45) Date of Patent: Jul. 22, 2014

(54) TEMPERATURE MEASUREMENT DEVICE AND TEMPERATURE MEASUREMENT METHOD

(75) Inventor: Kenji Goto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 13/078,477

(22) Filed: Apr. 1, 2011

(65) Prior Publication Data

US 2011/0243183 A1    Oct. 6, 2011

(30) Foreign Application Priority Data

Apr. 2, 2010   (JP) ................................. 2010-085852

(51) Int. Cl.
*G01K 3/00* (2006.01)
*G01K 7/00* (2006.01)
*G01K 1/00* (2006.01)

(52) U.S. Cl.
USPC ............................ 374/110; 374/166; 374/208

(58) Field of Classification Search
USPC ......................................... 374/166, 110, 208
See application file for complete search history.

(56) References Cited

U.S. PATENT DOCUMENTS

| | | | |
|---|---|---|---|
| 7,249,883 B2 | 7/2007 | Kuroda et al. | |
| 7,306,565 B2 * | 12/2007 | Fraden et al. | 600/549 |
| 8,292,495 B2 * | 10/2012 | Bieberich et al. | 374/1 |
| 2006/0056487 A1 * | 3/2006 | Kuroda et al. | 374/179 |
| 2012/0109572 A1 * | 5/2012 | Shimizu | 702/131 |
| 2012/0114013 A1 * | 5/2012 | Tsuchida | 374/185 |

FOREIGN PATENT DOCUMENTS

| | | | |
|---|---|---|---|
| JP | 56-162022 A | | 12/1981 |
| JP | 61120026 A | * | 6/1986 |
| JP | 08-254579 A | | 10/1996 |
| JP | 2006-308538 A | | 11/2006 |

\* cited by examiner

*Primary Examiner* — Mirellys Jagan
(74) *Attorney, Agent, or Firm* — Global IP Counselors, LLP

(57) ABSTRACT

A temperature measurement device includes a first surface temperature measurement part performing a measurement to be used as a first surface temperature; a first reference temperature measurement part performing a measurement to be used as a first reference temperature; a first external air temperature measurement part performing a measurement to be used as a first external air temperature; a second surface temperature measurement part performing a measurement to be used as a second surface temperature; a second reference temperature measurement part performing a measurement to be used as a second reference temperature; a second external air temperature measurement part performing a measurement to be used as a second external air temperature; a deep-part temperature computation part computing the deep-part temperature of a subject to be measured; and an external air temperature computation part computing the external air temperature of the external air.

2 Claims, 10 Drawing Sheets

TEMPERATURE MEASUREMENT DEVICE AND TEMPERATURE MEASUREMENT METHOD

CROSS-REFERENCE TO RELATED APPLICATIONS

This application claims priority to Japanese Patent Application No. 2010-085852 filed on Apr. 2, 2010. The entire disclosure of Japanese Patent Application No. 2010-085852 is hereby incorporated herein by reference.

BACKGROUND

1. Technical Field

The present invention relates to a temperature measurement device and a temperature measurement method.

2. Background Technology

Portable temperature measurement devices, particularly temperature measurement devices that are used while in contact with the human body, such as those worn on the wrist, detect external air temperature using a temperature sensor provided in a case or in an external peripheral part of the case. However, in temperature measurement devices, the temperature sensor has been affected by body temperature through the case when carried or worn, leading to concerns over an inability to accurately measure external air temperature.

The effect of body temperature acting through the case has been eliminated by having the heat-sensitive part protrude from the case and providing a predetermined gap relative to the case. There have also been proposed devices that detect whether or not the device is being worn and that carry out a temperature correction process when the device is being worn (e.g., refer to patent document 1).

A method for measuring the temperature of deep areas of the body using a simple configuration has been offered (e.g., refer to patent document 2).

Japanese Laid-open Patent Publication Nos. H08-254579 (patent document 1) and 2006-308538 (patent document 2) are examples of the related art.

SUMMARY

Problems to be Solved by the Invention

In patent document 1, an object is to reduce the effect of body temperature by manipulating the position of the temperature sensor. However, a concern is presented in that it is not possible to eliminate the effect of body temperature due to heat transferred by the case or sensor support part when the device worn on the body like a wristwatch. In addition, in patent document 2, it is not possible to accurately measure external air temperature at the same time.

Means Used to Solve the Above-Mentioned Problems

The invention was developed in order to resolve at least some of the above problems and can be implemented in the following modes or utilization examples.

[Utilization Example 1] The temperature measurement device of the invention includes: a first surface temperature measurement part subjected to measure, as a first surface temperature, a surface temperature of a subject to be measured; a first reference temperature measurement part subjected to measure, as a first reference temperature, the temperature at a position having a predetermined heat resistance value relative to the measurement position of the first surface temperature and having a first heat resistance value relative to external air; a first external air temperature measurement part subjected to measure, as a first external air temperature, the temperature at a position having a first heat resistance value relative to the measurement position of the first reference temperature and having a predetermined heat transfer coefficient relative to external air; a second surface temperature measurement part subjected to measure a second surface temperature at a surface position that is different from the first surface temperature measurement position; a second reference temperature measurement part subjected to measure, as a second reference temperature, the temperature at a position having a predetermined heat resistance value relative to the measurement position of the second surface temperature and having a second heat resistance value different from the first heat resistance value relative to external air; a second external air temperature measurement part subjected to measure, as a second external air temperature, the temperature at a position having a second heat resistance value relative to the measurement position of the second reference temperature and having a predetermined heat transfer coefficient relative to the external air; a deep-part temperature computation part subjected to compute a deep-part temperature of the subject to be measured using the first surface temperature, the first reference temperature, the second surface temperature, and the second reference temperature values; and an external air temperature computation part subjected to compute the external air temperature of the external air using the first surface temperature, the first reference temperature, the second surface temperature, the second reference temperature, the first external air temperature, and the second external air temperature values.

As a result, by using a sensor part that measures two different thermal flows, accurate deep temperatures and external air temperatures can be measured with a single device, even when worn on the body. In addition, even with temperature devices such as wristwatch-type or patch-type devices that perform measurements while worn on the human body or the like, deep temperatures and external air temperatures can be accurately measured with a single device having a simple structure.

The deep part of the subject to be measured referred to herein refers to a location having stable temperature distribution with little variation in temperature relative to the temperature at the surface of the body, e.g., a core part. Consequently, deep body temperature refers to core temperature, for example. Core temperature refers to a temperature that does not vary with changes in heat radiated into the environment under the influence of the outer shell of an organism or circulatory regulation under internal biological temperature conditions of homeothermic animals. Theoretically, this temperature is an average temperature of the core parts.

[Utilization Example 2] The temperature measurement device described above further includes a heat insulating part having the shared predetermined heat resistance value is provided between the first surface temperature measurement position and the first reference temperature measurement position and between the second surface temperature measurement position and the second reference temperature measurement position; a first heat releasing control part having the first heat resistance value is provided between the first reference temperature measurement position and external air; and the second heat releasing control part having the second heat resistance value is provided between the second reference temperature measurement position and the external air; wherein the temperature measurement device is configured so that the surface of the first heat releasing control part where contact is made with the external air and the surface of the second heat releasing control part where contact is made with the external air have equivalent predetermined heat transfer coefficients.

Accordingly, the first surface temperature measurement part and the second surface temperature measurement part are covered with a heat insulating part having a shared heat resistance value. Thus, the respective heat insulating parts are positioned between the surface temperature measurement position and the reference temperature measurement position. Also, first and second heat releasing control parts having mutually different heat resistance values are provided between the respective reference temperature measurement positions and the external air. The respective heat releasing control parts are positioned between the reference temperature measurement position and the external air temperature measurement position. Consequently, the thermal flux values are different between the first surface temperature measurement position and the first reference temperature measurement position and the first external air temperature measurement position, and between the second surface temperature measurement position and the second reference temperature measurement position and the second external air temperature measurement position. In other words, different values are measured for each of the first surface temperature, first reference temperature, second surface temperature, second reference temperature, first external air temperature, and second external air temperature.

In the deep-part temperature computation part, the heat resistance value is computationally eliminated by standardizing the heat resistance value of the heat insulating part that covers the first and second surface temperature measurement parts, and the deep temperature of the subject to be measured is computed using the first surface temperature, the first reference temperature, the second surface temperature, and the second reference temperature values.

Because the external air temperature computation part has a configuration in which the contact surface of the first heat releasing control part with external air and the contact surface of the second heat releasing control part with external air are made to have equivalent heat transfer coefficients, this heat transfer coefficient is computationally eliminated, and the deep temperature of the subject to be measured is computed using the first surface temperature, the first reference temperature, the second surface temperature, the second reference temperature, the first external air temperature, and the second external air temperature values.

Consequently, the deep temperature of the subject to be measured and the external air temperature of the external air are computed irrespective of the heat resistance value from the deep part to the surface part specific to the subject to be measured, so that even if the heat transfer characteristics vary in accordance with differences in the shape of the subject to be measured, the deep temperature of the subject to be measured and the external air temperature are accurately computed using a plurality of temperature measurement parts provided in the heat insulating part and heat releasing control part.

[Utilization Example 3] The temperature measurement device described above further includes a display device having a display part subjected to display the deep-part temperature computed by the deep-part temperature computation part and the external air temperature computed by the external air temperature computation part; and a temperature gauge body having the first surface temperature measurement part, the second surface temperature measurement part, the first reference temperature measurement part, the second reference temperature measurement part, the first external air temperature measurement part, and the second external air temperature measurement part, wherein the display device and the temperature measurement main body are configured as separate entities.

Accordingly, because the display device and temperature gauge body are constituted by separate bodies, the weight of the temperature gauge body that has the first and second surface temperature measurement parts that require contact with the surface of the subject to be measured is decreased. Consequently, there is less load on the surface of the subject to be measured when the temperature gauge body is in contact for long periods of time, which allows continuous temperature monitoring over a long period of time.

[Utilization Example 4] For the aforedescribed temperature measurement device, the deep-part temperature computation part and the external air temperature computation part are provided in the display device.

Accordingly, because the deep-part temperature computation part and external air temperature computation part are provided in the display device, the constitutive components of the temperature gauge body are controlled to a minimum. Consequently, the weight and size of the temperature gauge body are additionally reduced, and the load when in contact with the surface of the subject to be measured is additionally reduced during measurement over long periods of time.

[Utilization Example 5] For the temperature measurement device described above, the display device and the temperature gauge body respectively include transceiver parts capable of wirelessly sending and receiving data between each other.

Accordingly, transceiver parts are provided in the display device and temperature gauge body, producing a configuration in which wireless communication is possible, which allows the display device to be disposed at some distance from the temperature gauge body. Because the display device is not wired to the temperature gauge body, the temperature gauge body can be completely separate from the display device, thereby allowing further reduction in the weight of the temperature gauge body and improving the usability of the temperature gauge body.

[Utilization Example 6] For the temperature measurement device described above, the temperature gauge body is configured so as to be capable of being affixed to the surface of the subject to be measured.

Accordingly, the operability and portability of the temperature gauge body are improved because the temperature gauge body is configured so that it can be affixed to the surface of the subject to be measured.

[Utilization Example 7] A temperature measurement method includes: measuring a first surface temperature of a subject to be measured; measuring, as a first reference temperature, the temperature at a position having a predetermined heat resistance value relative to the measurement position of the first surface temperature and having a first heat resistance value relative to external air; measuring, as a first external air temperature, the temperature at a position having a first heat resistance value relative to the measurement position of the first reference temperature and having a predetermined heat transfer coefficient relative to external air measuring a second surface temperature at a surface position that is different from the first surface temperature measurement position; measuring, as a second reference temperature, the temperature at a position having a predetermined heat resistance value relative to the measurement position of the second surface temperature and having a second heat resistance value different from the first heat resistance value relative to external air; and measuring, as a second external air temperature, the temperature at a position having a second heat resistance value relative to the measurement position of the second reference temperature and having a predetermined heat transfer coefficient relative to the external air; computing a deep-part temperature of the subject to be measured on the basis of the first surface temperature, the first reference temperature, the second surface temperature, and the second reference temperature values; and computing the external air temperature of the external air on the basis of the first surface temperature, the first reference temperature, the second surface temperature, the second reference temperature, the first external air temperature, and the second external air temperature values.

Accordingly, because sensor parts that measure two different heat flows are used, the deep temperature and external air temperature can be accurately measured with a single device, even when worn on the body. In addition, with a temperature measurement device having the form of a wristwatch or patch whereby measurement is carried out while worn on a body or the like, measurement of deep temperature and external air temperature can be carried out accurately with a single device that has a simple structure.

DETAILED DESCRIPTION OF EXEMPLARY EMBODIMENTS

The electronic body temperature gauge pertaining to the embodiments is described below in reference to the accompanying drawings.

First Embodiment

This embodiment is described below in reference to the accompanying drawings.

Figure 1:
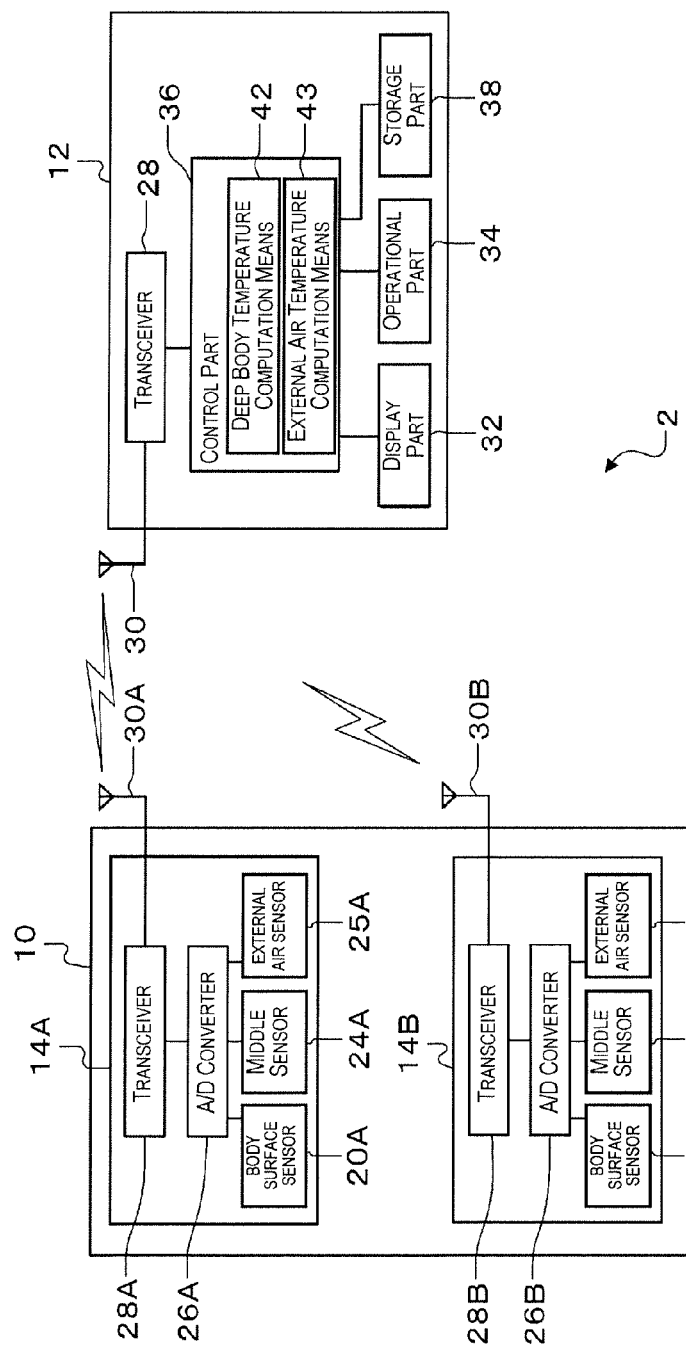
FIG. 1 is a block diagram showing the electronic body temperature gauge pertaining to the first embodiment.

FIG. 1 is a block diagram showing an electronic body temperature gauge as an example of the temperature measurement device of the embodiment.

The electronic body temperature gauge 2 of this embodiment has a temperature gauge body 10 that is in contact with a body surface 4A (refer to FIG. 3) of a human body 4 which is the subject to be measured and a display device 12 that is provided separate from the temperature gauge body 10. In this embodiment, because the display device 12 and the temperature gauge body 10 are configured as separate bodies, the weight of the temperature gauge body 10 that must be in contact with the surface of the body 4 is additionally decreased. Consequently, continuous monitoring of temperature over long periods of time is possible because there is a lack of burden, even when the temperature gauge body 10 is in contact with the surface of the body 4 for long periods of time.

Figure 2:
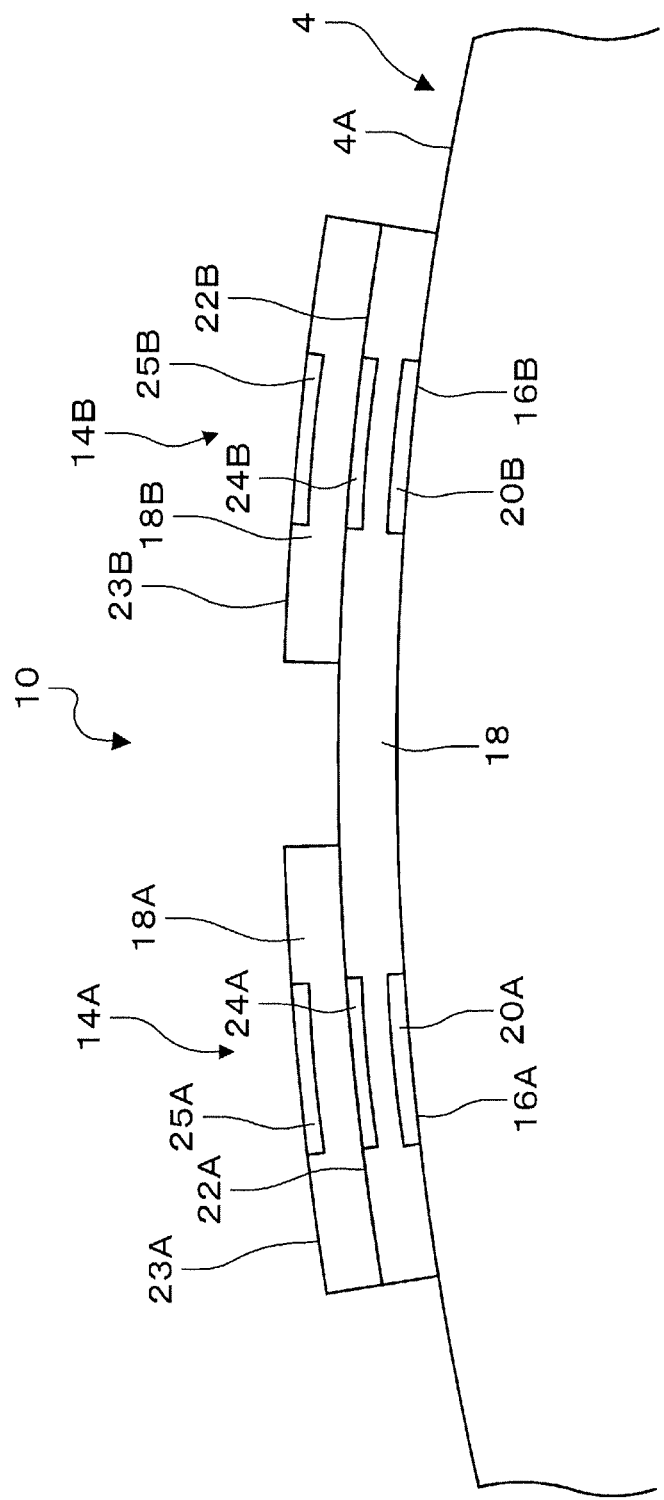
FIG. 2 is an enlarged view showing a state in which the temperature gauge body pertaining to the first embodiment is worn on a body.
Figure 3:
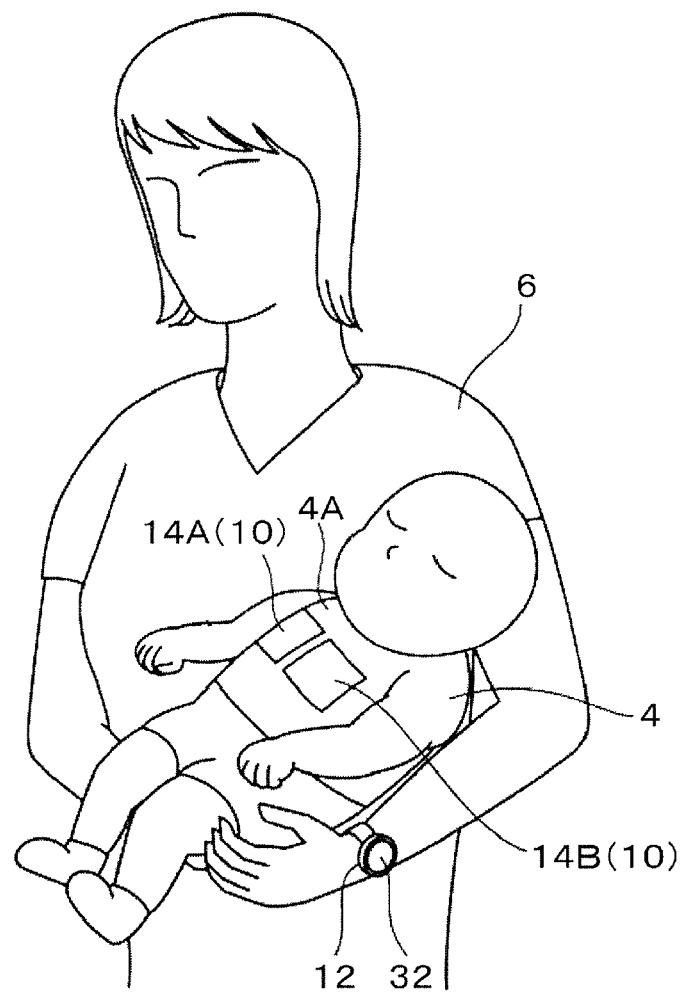
FIG. 3 is a diagram showing a state in which the temperature gauge body and display device of embodiment 1 are mounted.

FIG. 2 is an enlarged view showing a state in which the temperature gauge body 10 of this embodiment is worn on the body 4. In addition, FIG. 3 is a view of a state in which the temperature gauge body 10 and the display device 12 of this embodiment are worn.

First, as shown in FIG. 2, the temperature gauge body 10 has two (a pair of) temperature measurement parts 14A, 14B. The temperature measurement part 14A has a heat insulating part 18 that has a contact surface 16A that is in contact with the body surface 4A of the body 4 and a first heat releasing control part 18A that is provided between the heat insulating part 18 and the external air. The temperature measurement part 14B has a heat insulating part 18 having a contact surface 16B that is in contact with the body surface 4A at a different position from the contact position of the temperature measurement part 14A and a second heat releasing control part 18B provided between the heat insulating part 18 and the external air. Specifically, the heat insulating part 18 is shared by the temperature measurement part 14A and the temperature measurement part 14B and has a shared heat resistance value. In addition, the contact surface 23A of the first heat releasing control part 18A where contact is made with external air, and the contact surface 23B of the second heat releasing control part 18B where contact is made with external air have a structure, surface area, and roughness constituted in such a manner that the heat transfer coefficients are equivalent.

The temperature measurement parts 14A, 14B in this embodiment are vertically layered. In this embodiment, the surface area of the temperature measurement body 10 is divided in two in accordance with to the number of temperature measurement parts. The vertical length of the temperature gauge body 10 is divided in two in accordance with the number of heat insulating materials for each temperature measurement part. There are three sensors for each of the temperature measurement parts. This embodiment has favorable surface area utilization and material utilization in the portions not requiring the upper heat insulating materials.

The temperature measurement part 14A has a body surface sensor 20A used as a first surface temperature measurement part, which measures the temperature of the body surface 4A to obtain the first body surface temperature, a middle sensor 24A used as a first reference temperature measurement part that measures the temperature of the interface 22A between the heat insulating part 18 and the first heat releasing control part 18A to obtain the first reference temperature, and an external air sensor 25A used as a first external air temperature measurement part that measures the temperature of the contact surface 23A of the first heat releasing control part 18A with external air to obtain the first external air temperature.

In addition, the temperature measurement part 14B has a body surface sensor 20B used as a second surface temperature measurement part that measures the temperature of the body surface 4A to obtain the second body surface temperature, a middle sensor 24B used as a second reference temperature measurement part that measures the temperature of the interface 22B between the heat insulating part 18 and the second heat releasing control part 18B to obtain the second reference temperature, and an external air sensor 25B used as a second external air temperature measurement part that measures the temperature of the contact surface 23B of the second heat releasing control part 18B with external air to obtain the second external air temperature.

The temperature gauge body 10 including these temperature measurement parts 14A, 14B is configured in a manner whereby each of the contact surfaces 16A, 16B can be affixed to the body 4 by an adhesive or the like, where this adhesive or the like achieves tight contact on the body surface 4A with favorable contact pressure. In this embodiment, the temperature gauge body 10 is tightly affixed to the chest region of an infant (body 4).

It is preferable for the temperature gauge body 10 to be affixed in a region that allows comparatively stable body surface temperature measurement, for example, on the forehead, back of the head, chest, or middle back. In addition, the temperature gauge body 10 may be in contact with bedding when clothing is worn over the temperature gauge body 10. In this embodiment, the temperature gauge body 10 is configured so that it can be affixed to the surface of the body 4, thereby improving the operability and portability of the temperature gauge body 10.

In addition, the first heat releasing control part 18A of the temperature measurement part 14A and the second heat releasing control part 18B of the temperature measurement part 14B may be made from different materials. As a result, the heat resistance value of the first heat releasing control part 18A may be set to a value that is different from the heat resistance value of the second heat releasing control part 18B.

The body surface sensors 20A, 20B, the middle sensors 24A, 24B, and the external air sensors 25A, 25B can be, devices that convert the temperature of the body surface 4A, the temperature at the interfaces 22A, 22B, and the temperature of the contact surfaces 23A, 23B to resistance values, or devices that convert the temperature values to voltage values. Devices that convert temperatures to resistance values that may be used are chip thermistors, flexible substrates printed with thermistor patterns, and platinum temperature measurement resistors. In addition, devices that can be used for converting temperature to voltage values include thermocouple elements, PN junction elements, and diodes. In this embodiment, the temperature measurement part 14A and the temperature measurement part 14B have different heat flux values between the position of the body surface sensor 20A and the position of the external air sensor 25A, and between the position of the body surface sensor 20B and the position of the external air sensor 25B. In other words, mutually different values are measured for the first surface temperature and second surface temperature, for the first reference temperature and second reference temperature, and for the first external air temperature and second external air temperature.

In addition, the temperature measurement parts 14A and 14B, in addition to the body surface sensors 20A, 20B, the middle sensors 24A, 24B, and the external air sensors 25A, 25B, have A/D converters 26A, 26B and transceiver parts 28A, 28B, as shown in FIG. 1. Because the temperature measurement parts 14A, 14B are formed as an integral body, the A/D converters 26A, 26B can be combined into a shared A/D converter, and the transceiver parts 28A, 28B can be combined into a shared transceiver part.

The A/D converters 26A, 26B convert the analog signals for resistance values and voltage values converted by the body surface sensors 20A, 20B, the middle sensors 24A, 24B, and the external air sensor 25A, 25B into digital signals, which are then output to the transceivers 28A, 28B.

Each of the transceiver parts 28A, 28B has an antenna coil 30a, 30B that transmits signals for the temperature values (resistance values or voltage values) that have been converted to digital signals by the A/D converters 26A, 26B to the display device 12. The antenna coils 30A, 30B may also be a shared antenna coil.

The display device 12, as shown in FIG. 3, is configured in a portable wristwatch-type device so as to be wearable by an operator 6 holding an infant on which the temperature gauge body 10 has been mounted. The display device 12, as shown in FIG. 1, has a transceiver part 28 that sends and receives signals to and from the temperature gauge body 10, a display part 32 that displays body temperature measurement results and the like, an operational part 34 that allows the display device 12 to be externally operated, a control part 36 that controls operation of the display device 12, and a storage part 38 that stores information obtained from the transceiver 28, the control part 36, and the like.

The transceiver part 28 has an antenna coil 30 and both emits and receives radio waves between the antenna coils 30A and 30B of the temperature gauge body 10. In addition, the antenna coil 30, by carrying out transmission of radio waves to the antenna coils 30A and 30B generates excitation power as a result of electromagnetic induction in the antenna coils 30A, 30B and thereby charges the temperature measurement parts 14A, 14B. As a result, the temperature gauge body 10 is driven by this excitation power, and an internal power source such as a battery is not required. In this embodiment, the display device 12 and the temperature gauge body 10 respectively have transceiver parts 28, 28A, 28B, producing a configuration in which wireless communication is possible, thus allowing the display device 12 to be installed at a distance from the temperature gauge body 10. Because the display device 12 is not wired to the temperature gauge body 10, the temperature gauge body 10 can be completely separated from the display device 12, thereby additionally reducing the weight of the temperature gauge body 10 and improving the usability of the temperature gauge body 10.

The display part 32 displays temperature information or the operational screen using a liquid crystal screen or the like. For example, the display part can display the body surface temperature that has been measured, the computed deep body temperature, the external air temperature, and the like. In this embodiment, the display part 32 is provided in a region corresponding to the normal text plate of a wristwatch, and the operator 6 can view the display part 32 in a state in which the display device 12 is attached to the wrist.

The operational part 34 is configured to allow input of external information to the display device 12 using buttons, levers, keys, or the like. For example, menus can be selected in accordance with a screen displayed on the display part 32, or information can be input, such as the name, age, and body temperature measurement times for the subject of measurement (an infant in this embodiment).

The control part 36 has a deep-part temperature computation part that is used as the deep-part temperature computation part 42 for computing the deep body temperature of the body 4 based on the first body surface temperature, the second body surface temperature, the first reference temperature, and the second reference temperature.

In addition, the control part 36 has an external air temperature computation part 43 that computes the external air temperature based on the first body surface temperature, the second body surface temperature, the first external air temperature, the second external air temperature, the first reference temperature, and the second reference temperature. In this embodiment, the deep body temperature computation part 42 and the external air temperature computation part 43 are provided on the display device 12, and thus the constituent components of the temperature gauge body 10 can be kept to a minimum. Consequently, the weight and size of the temperature gauge body 10 can be additionally decreased, and the burden when in contact with the surface of the body 4 and measurements are carried out over long periods of time can be further reduced.

Based on the above configuration, since the heat flux in the temperature measurement part 14A or temperature measurement part 14B is constant under normal conditions, the deep body temperature relational formulas (1) and (2) below are obtained, taking the first body surface temperature as T1, the second body surface temperature as T3, the first reference temperature as T2, the second reference temperature as T4, the deep body temperature as Tcore, the heat resistance from the deep part of the body 4 to the body surface 4A as Rb, and the heat resistance of the heat insulating part 18 as Rs.

[Numerical formula 1]

$$\frac{T3 - Tcore}{Rb} = \frac{T4 - T3}{Rs} \quad (1)$$

$$\frac{T1 - Tcore}{Rb} = \frac{T2 - T1}{Rs} \quad (2)$$

Thus, the deep body temperature Tcore is obtained from relational formula of formula (3).

[Numerical formula 2]

$$Tcore = \frac{T3(T1 - T2) - T1(T3 - T4)}{(T1 - T2) - (T3 - T4)} \quad (3)$$

In addition, taking the first external air temperature as T5, the second external air temperature as T6, and the external air temperature as Tout, then the relational formulas of formulas (4) and (5) are obtained for external temperature.

[Numerical formula 3]

$$\frac{T1 - T2}{Rs} = h(T5 - Tout) \quad (4)$$

$$\frac{T3 - T4}{Rs} = h(T6 - Tout) \quad (5)$$

h denotes the heat transfer coefficient of the contact surfaces 23A, 23B. Thus, the external temperature Tout is obtained by the relational formula of formula (6).

[Numerical formula 4]

$$Tout = \frac{T6(T1 - T2) - T5(T3 - T4)}{(T1 - T2) - (T3 - T4)} \quad (6)$$

Consequently, formula (3) above is stored as the computation formula for the deep body temperature Tcore in the deep body temperature storage part 42. In addition, formula (6) above is stored as the computation formula for the external air temperature Tout in the external air temperature storage part 43.

The first body surface temperature T1, the second body surface temperature T3, the first reference temperature T2, the second reference temperature T4, the first external air temperature T5, and the second external air temperature T6 that are transmitted from the temperature gauge body 10 are stored in the storage part 38. In addition, the deep body temperature Tcore of the body 4 is stored in the deep body temperature storage part 42, and the external air temperature Tout of the external air is stored in the external air temperature storage part 43.

The storage part 38 is constituted so as to allow storage of the temperature data related to a plurality of bodies 4, and the deep body temperature Tcore for each body 4 is thus stored. In addition, the storage part 38 can store measurement positions, such as the positions of the first body surface temperature T1 and the second body surface temperature T3 that are measured when computing the deep body temperature Tcore, as well as the first external air temperature T5 and the second external air temperature T6 that are measured when computing the external air temperature Tout. In addition to the temperature data described above, for example, the name, age, measurement time, and other measurement data related to the subject to be measured (body 4, infant) can be stored in the storage part 38. In this case, these measurement data can be input from the operational part 34.

The electronic body temperature gauge 2 operates in the manner described below.

Figure 4:
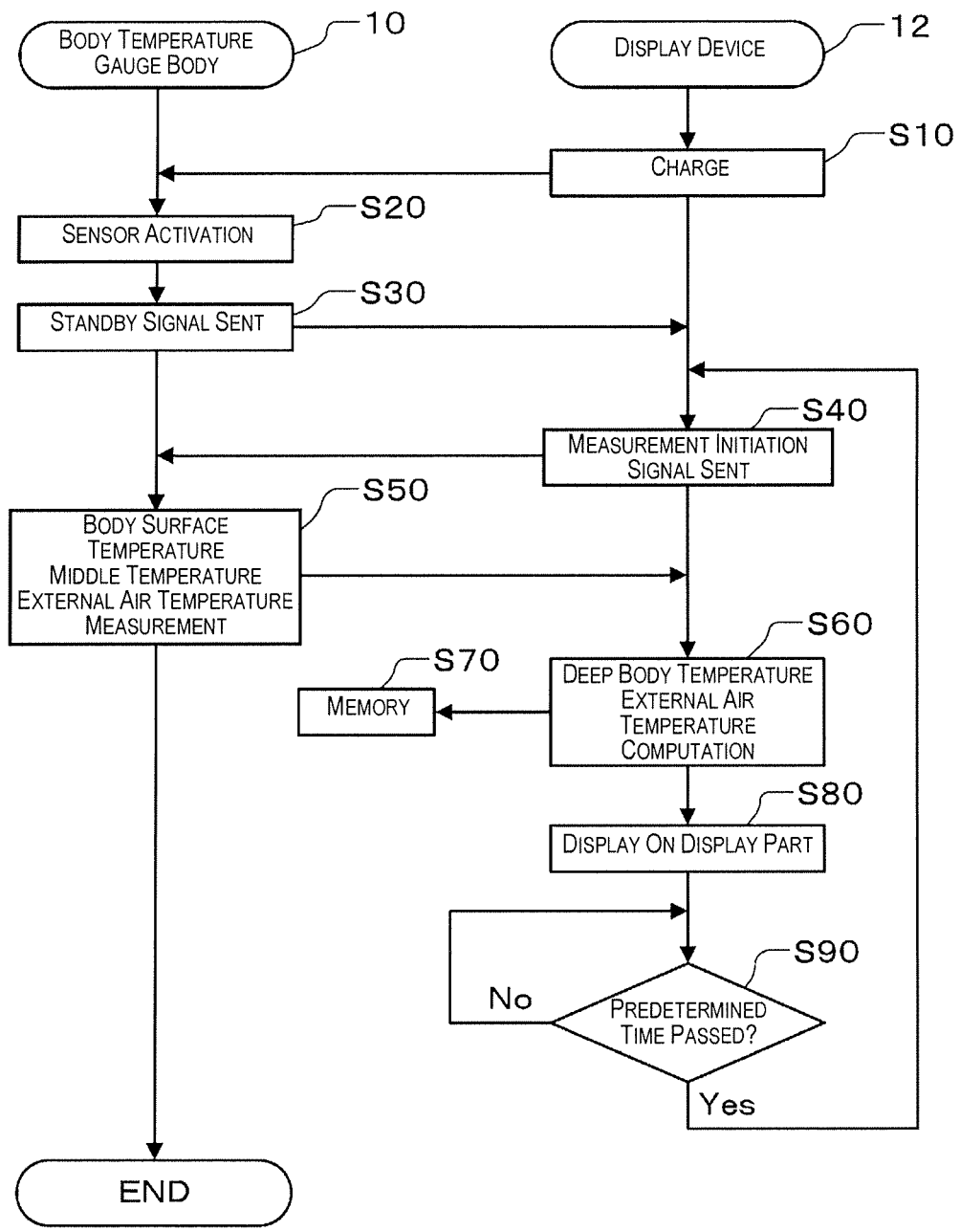
FIG. 4 is a flow chart showing operation of the electronic body temperature gauge of the first embodiment.

FIG. 4 is a flow chart showing the operation of the electronic body temperature gauge 2 of this embodiment.

The temperature gauge body 10 is worn on the body (the chest of an infant in this embodiment), and the operator 6 of the electronic body temperature gauge 2 who is holding the infant wears the display device 12 on the wrist. By operating the operational part 34 of the display device 12, the operator 6 turns the switch for the display device 12 ON, and radio waves are transmitted by the transceiver part 28 to the temperature gauge body 10 (temperature measurement part 14A and temperature measurement part 14B) via the antenna coil 30. The electromagnetic induction resulting from these radio waves generates an electromotive force in the antenna coils 30A, 30B, which charges the temperature gauge body 10 (step S10).

The temperature gauge body 10 is activated by the electromotive force (step S20), and the body surface sensors 20A, 20B, the middle sensors 24A, 24B, and the external air sensors 25A, 25B are activated.

When these sensors 20A, 20B, 24A, 24B, 25A, 25B are activated, the temperature gauge body 10 sends a standby signal from the transceivers 28A, 28B to the display device 12 via the antenna coils 30A, 30B (step S30).

The control part 36 of the display device 12, upon receiving the standby signal, transmits a temperature measurement initiation signal from the transceiver part 28 via the antenna coil 30 (step S40).

The temperature gauge body 10 receives this temperature measurement initiation signal, the body surface sensors 20A, 20B, the middle sensors 24A, 24B, and the external air sensors 25A, 25B are activated, and the first body surface temperature T1 and second body surface temperature T3 of the body surface 4A, the first reference temperature T2 and second reference temperature T4 of the interfaces 22A, 22B, and the first external air temperature T5 and second external air temperature T6 of the contact surfaces 23A, 23B are measured (step S50, first temperature measurement step and second temperature measurement step). The temperature data for the body surface temperatures T1, T3, reference temperatures T2, T4, and external air temperatures T5, T6 are converted from analog signals to digital signals by the A/D conversion parts 26A, 26B and are transmitted by the transceiver parts 28A, 28B to the display device 12 via the antenna coils 30A, 30B. In addition, the surface temperatures T1, T3 and the reference temperatures T2, T4 are preferably measured after passage of a predetermined time period, so that the heat conveyed from the deep parts of the body 4 to the body surface 4A is in a steady state (equilibrium state).

At the deep body temperature computation part 42 of the control part 36, the deep body temperature Tcore is computed by substituting the body surface temperatures T1, T3 and the reference temperatures T2, T4 for T1, T2, T3, and T4 in formula (3) (step S60, deep temperature computation step).

In addition, at the external air temperature computation part 43 of the control part 36, the external air temperature Tout is computed by substituting the body surface temperatures T1, T3, the reference temperatures T2, T4, and the external air temperatures T5, T6 in for T1, T2, T3, T4, T5, and T6 in formula (6) (step S60, external air temperature computation step).

The control part 36 stores the deep body temperature Tcore and the external air temperature Tout in the storage part 38 (step S70) and displays the deep body temperature Tcore and external air temperature Tout on the display 32 (step S80). The operator 6 can check the deep body temperature Tcore and the external air temperature Tout on the display part 32 of the wristwatch-form display device 12 while carrying the infant.

The control part 36 counts the passage of time from the measurement time for the body surface temperatures T1, T3 using an on-board timer so that passage of a predetermined time period can be monitored (step S90). When at least the predetermined time period has passed, the process returns to step S40, the control part 36 transmits a temperature measurement initiation signal to the temperature gauge body 10, and measurement of the body surface temperatures T1, T3, the reference temperatures T2, T4, and the external air temperatures T5, T6 is carried out again.

In this manner, the body surface temperatures T1, T3, the reference temperatures T2, T4, and the external air temperatures T5, T6 are measured at a predetermined time interval, and the deep body temperature Tcore and the external air temperature Tout are computed and stored in the storage part 38. In this embodiment, sensors that measure two different heat flows are used, and the deep body temperature Tcore and external air temperature Tout can be accurately measured with a single device, even when worn on the body. In addition, the deep body temperature Tcore and external air temperature Tout can be accurately measured with a single device having a simple structure, even with an electronic body temperature gauge such as a wristwatch or patch-type device that performs measurements when mounted on the body 4 or the like. In addition, the temperature gauge body 10 has an on-board battery so that temperatures can be measured without external charging.

Working Example 1

Figure 5:
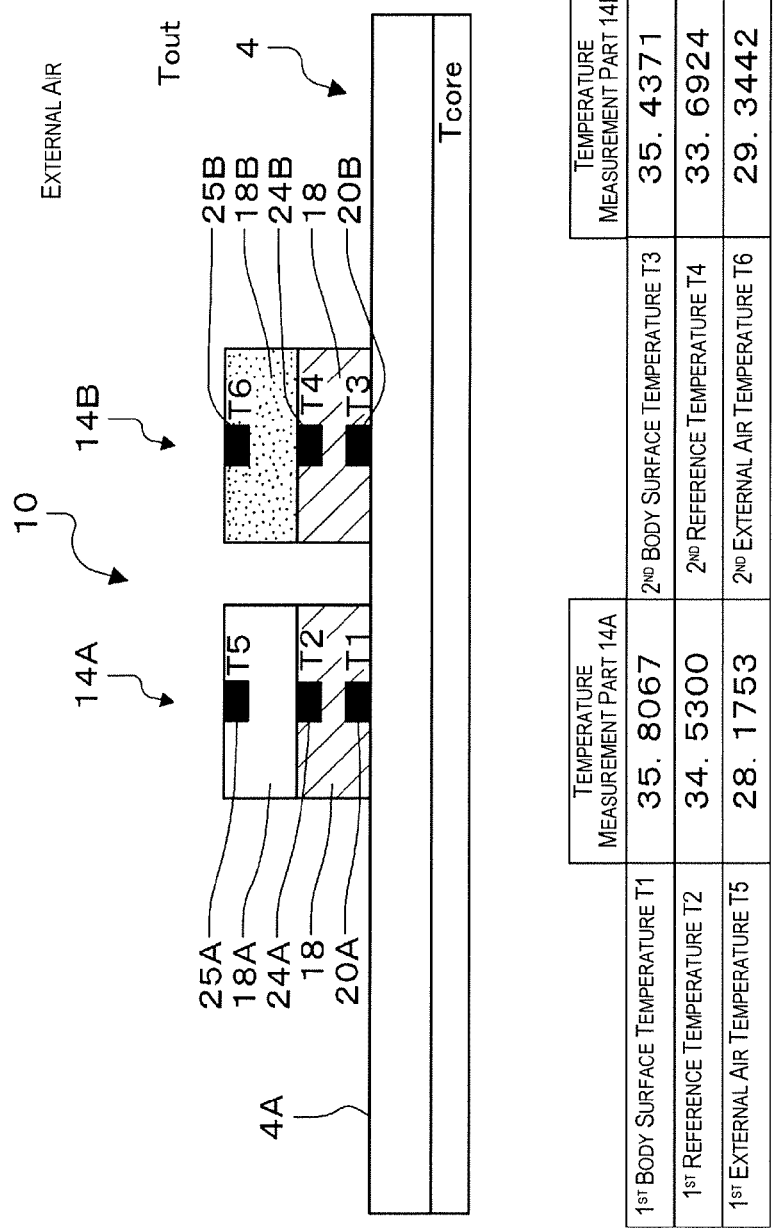
FIG. 5 is a diagram showing the temperature gauge body and results of measurement in Working Example 1.

FIG. 5 is a diagram showing the temperature gauge body 10 pertaining to a working example and the results of measurement.

In this working example, the measurement results obtained using the temperature gauge body 10 are described.

The measurement conditions in this working example are described below. The external air temperature is set at 25° C.

In addition, the deep temperature of the body 4 (10 mm below) is 37° C., and the heat transfer coefficient is 0.3 (W/mK).

The temperature measurement parts 14A, 14B are cylindrical bodies with diameters of 50 mm. The temperature measurement part 14A has, layered from the side of the body surface 4A, a silicone material used as heat insulating part 18 with a heat transfer coefficient of 0.05 (W/mK) and a first heat releasing control part 18A with a heat transfer coefficient of 0.01 (W/mK). The temperature measurement part 14B has, layered from the side of the body surface 4A, a silicone material used as heat insulating part 18 with a heat transfer coefficient of 0.05 (W/mK) and a second heat releasing control part 18B with a heat transfer coefficient of 0.02 (W/mK). The thickness of each is 2 mm.

In this embodiment, as shown in FIG. 5, the body surface sensors 20A, 20B are at positions of 0 mm from the body surface 4A, the middle sensors 24A, 24B are at positions 2 mm from the body surface 4A, and the external air sensors 25A, 25B are at positions 4 mm from the body surface 4A.

Of the measurement results for the respective sensors, the deep body temperature Tcore is computed by substituting the first body surface temperature T1, the first reference temperature T2, the second body surface temperature T3, and the second reference temperature T4 into formula (3). In addition, the external air temperature Tout is computed by substituting the first body surface temperature T1, the first reference temperature T2, the second body surface temperature T3, the second reference temperature T4, the first external air temperature T5, and the second external air temperature T6 into formula (6).

As a result, the deep body temperature Tcore has an error of −0.18503 for a set value of 36.81497. In addition, the external air temperature Tout has an error of −0.01345 for a set value of 24.98655.

Second Embodiment

Figure 6:
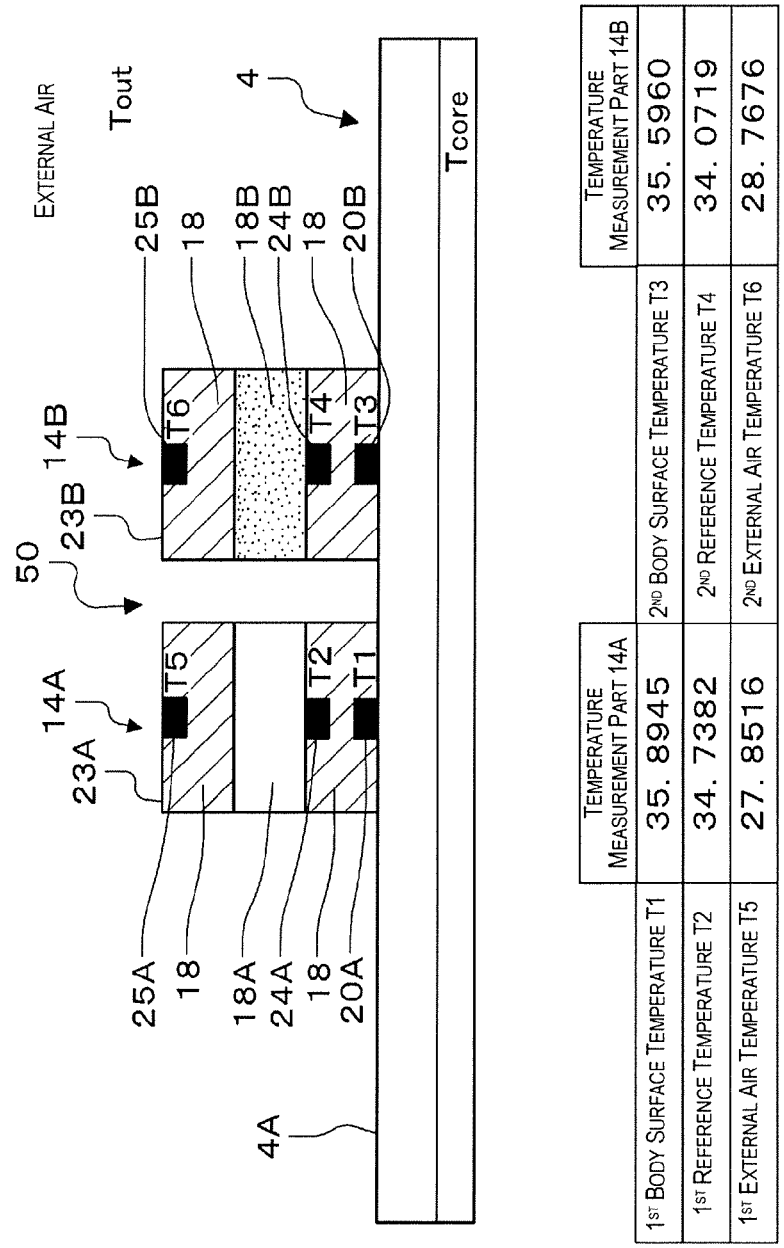
FIG. 6 is a diagram showing the temperature gauge body and measurement results in the second embodiment.

FIG. 6 is a diagram showing the temperature gauge body of this embodiment and the results of measurement.

The temperature gauge body 50 pertaining to this embodiment, as shown in FIG. 6, has two (a pair of) temperature measurement parts 14A, 14B. The temperature measurement part 14A has a first heat releasing control part 18A provided relative to the heat insulating part 18. The temperature measurement part 14B has a second heat releasing control part 18B provided relative to the heat insulating part 18. The structure, surface area, and roughness of each of the contact surfaces of the heat insulating parts 18 that are in contact with external air are configured so that the heat transfer coefficients h are equivalent. The temperature measurement part 14a has an external air sensor 25A that measures the temperature of the contact surface 23A of the heat insulating part 18 with respect to air as the first external air temperature. In addition, the temperature measurement part 14B has an external air sensor 25B that measures the temperature of the contact surface 23B of the heat insulating part 18 with respect to external air as the second external air temperature. The rest of the configuration is the same as in Working Example 1.

The temperature measurement parts 14A, 14B of this embodiment are vertically layered. In this embodiment, the surface area of the temperature gauge body 50 is divided in two in accordance with the number of temperature measurement parts. The vertical height of the temperature gauge body 50 is divided in three in accordance with the number of heat insulating materials for each temperature measurement part. The number of sensors in a single temperature measurement part is three.

Working Example 2

In this embodiment, the measurement results obtained using the temperature gauge body 50 are described.

The measurement conditions in this working example are described below. The temperature measurement part 14A has, layered from the side of the body surface 4A, a silicone material heat insulating part 18 with a heat transfer coefficient of 0.05 (W/mK), a first heat releasing control part 18A with a heat transfer coefficient of 0.01 (W/mK), and a silicone material heat insulating part 18 with a heat transfer coefficient of 0.05 (W/mK). The temperature measurement part 14B has, layered from the side of the body surface 4A, a silicone material heat insulating part 18 with a heat transfer coefficient of 0.05 (W/mK), a second heat releasing control part 18B with a heat transfer coefficient of 0.02 (W/mK), and a silicone material heat insulating part 18 with a heat transfer coefficient of 0.05 (W/mK). The thickness of each is 2 mm. The other measurement conditions are the same as in Working Example 1.

In this working example, as shown in FIG. 6, the body surface sensors 20A, 20B are positioned at 0 mm from the body surface 4A, and the middle sensors 24A, 24B are positioned 2 mm from the body surface 4A.

The external air sensors 25A, 25B are positioned 6 mm from the body surface 4A.

Of the measurement results for the respective sensors, the deep body temperature Tcore is computed by substituting the first body surface temperature T1, the first reference temperature T2, the second body surface temperature T3, and the second reference temperature T4 into formula (3). In addition, the external air temperature Tout is computed by substituting the first body surface temperature T1, the first reference temperature T2, the second body surface temperature T3, the second reference temperature T4, the first external air temperature T5, and the second external air temperature T6 into formula (6). As a result, the deep body temperature Tcore has an error of −0.16707 for a set value of 36.83293. In addition, the external air temperature Tout has an error of −0.02185 for a set value of 24.97185.

Third Embodiment

Figure 7:
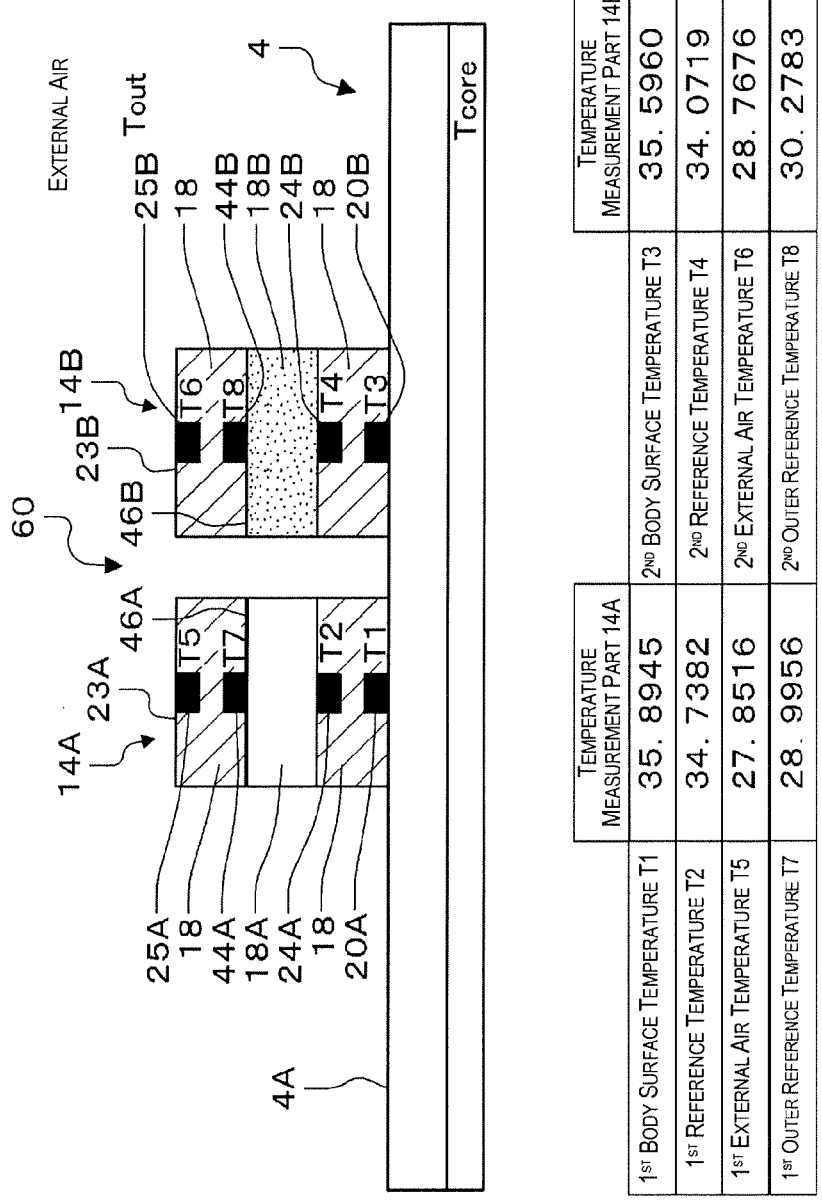
FIG. 7 is a diagram showing the temperature gauge body and measurement results in the third embodiment.

FIG. 7 is a diagram showing the temperature gauge body of this embodiment and the results of measurement.

The temperature gauge body 60 of this embodiment, as shown in FIG. 7, has two (a pair of) temperature measurement parts 14A, 14B. The remainder of the configuration is the same as in Working Example 2.

The temperature measurement part 14A has an outer middle sensor 44A that measures the temperature of the interface 46A between the first heat releasing control part 18A and the heat insulating part 18 to obtain a first external reference temperature. In addition, the temperature measurement part 14B has an outer middle sensor 44B that measures the temperature of the interface 46B between the second heat releasing control part 18B and the heat insulating part 18 to obtain a second external reference temperature. The remainder of the configuration is similar to Working Example 1.

The temperature measurement parts 14A, 14B of this embodiment are vertically layered. In this embodiment, the surface area of the temperature gauge body 60 is divided in two in accordance with the number of temperature measurement parts. The vertical height of the temperature gauge body 60 is divided in three in accordance with the number of heat insulating materials for each temperature measurement part. The number of sensors in a single temperature measurement part is four.

From the above configuration, because the thermal flux in each part is constant under steady state conditions, the relational formulas of formula (7) and formula (8) below are obtained in regard to the external air temperature Tout.

[Numerical formula 5]

$$\frac{T7 - T5}{Rs} = h(T5 - Tout) \quad (7)$$

$$\frac{T8 - T6}{Rs} = h(T6 - Tout) \quad (8)$$

Thus, the relational formula of formula 9 is obtained for the external air temperature Tout.

[Numerical formula 6]

$$Tout = \frac{T6(T7 - T5) - T5(T8 - T6)}{(T7 - T5) - (T8 - T6)} \quad (9)$$

Consequently, formula (9) is stored in the external air temperature computation part 43 as the computation formula for the external air temperature Tout.

Working Example 3

In this working example, the measurement results obtained using the temperature gauge body 60 are described.

The measurement conditions in this working example are the same as in working Example 2.

In this working example, as shown in FIG. 7, the body surface sensors 20A, 20B are positioned at 0 mm from the body surface 4A, and the middle sensors 24A, 24B are positioned 2 mm from the body surface 4A.

The outer middle sensors 44A, 44B are positioned 4 mm from the body surface 4A. The external air sensors 25A, 25B are positioned 6 mm from the body surface 4A.

Of the measurement results for the respective sensors, the deep body temperature Tcore is computed by substituting the first body surface temperature T1, first reference temperature T2, second body surface temperature T3, and second reference temperature T4 into formula (3). In addition, the external air temperature Tout is computed by substituting the first external air temperature T5, the first external reference temperature T7, the second external air temperature T6, and the second external reference temperature T8 into formula (9). As a result, the deep body temperature Tcore has an error of −0.16707 for a set value of 36.83293. In addition, the external air temperature Tout has an error of −0.00606 for a set value of 24.99394.

Fourth Embodiment

Figure 8:
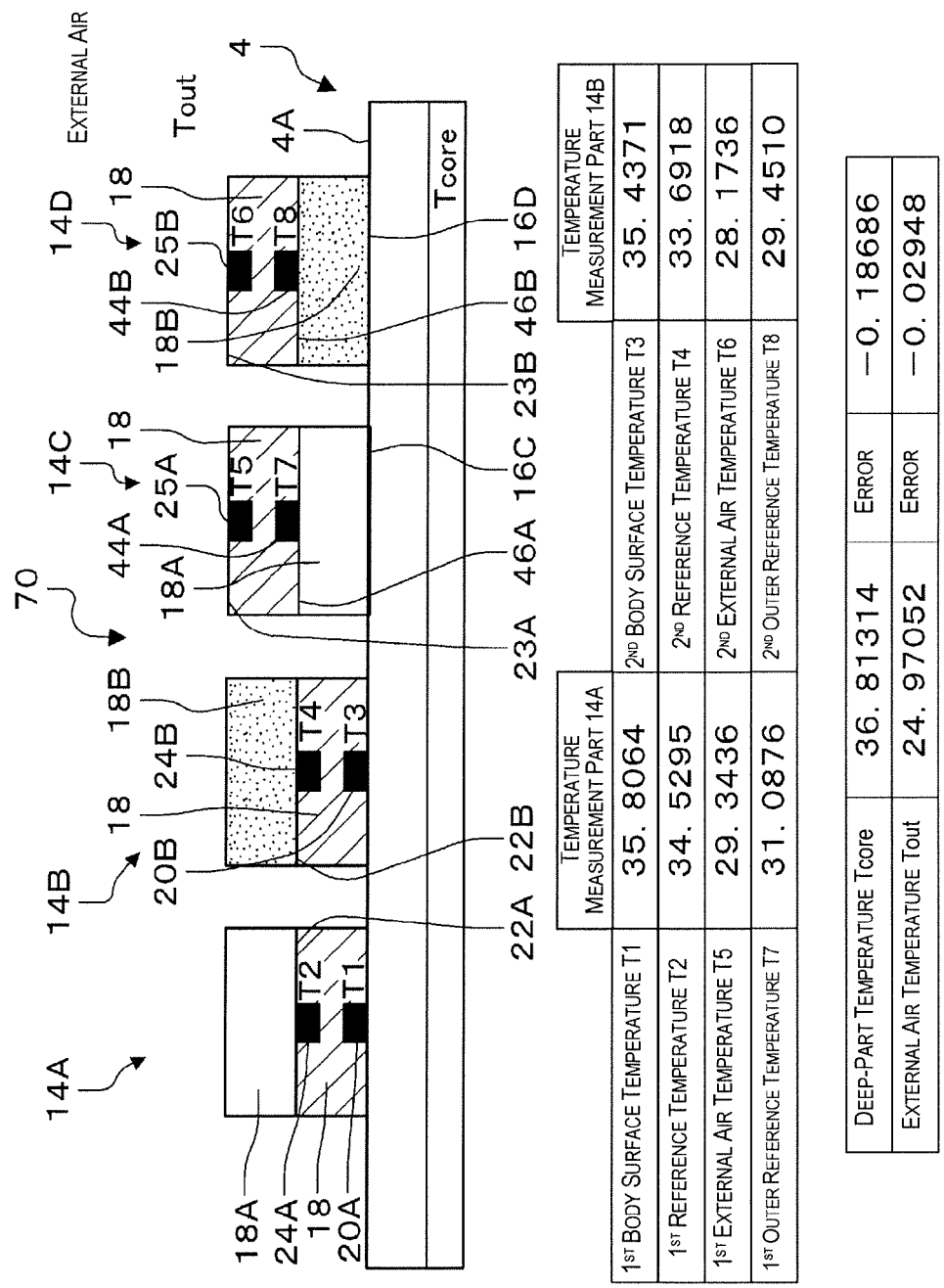
FIG. 8 is a diagram showing the temperature gauge body and measurement results in the fourth embodiment.

FIG. 8 is a diagram showing the temperature gauge body pertaining to this embodiment and the results of measurement.

The temperature gauge body 70 pertaining to this embodiment, as shown in FIG. 8, has four (two pairs of) temperature measurement parts 14A, 14B, 14C, 14D. The temperature measurement part 14A has a first heat releasing control part 18A that is provided between the heat insulating part 18 and the external air. The temperature measurement part 14B has a second heat releasing control part 18B that is provided between the heat insulating part 18 and the external air. In addition, the temperature measurement part 14C has a first heat releasing control part 18A having a contact surface 16C that contacts the body surface 4A at a position different from the contact position of the temperature measurement part 14A, 14B, and a heat insulating part 18 provided between the first heat releasing control part 18A and external air. On the other hand, the temperature measurement part 14D has a second heat releasing control part 18B having a contact surface 16D that contacts the body surface 4A at a position different from the contact position of the temperature measurement parts 14A, 14B, 14C and a heat insulating part 18 provided between the second heat releasing control part 18B and external air. Specifically, the heat insulating part 18 is shared by the temperature measurement parts 14A, 14B, 14C, and 14D, and thus a shared heat resistance value is present.

The temperature measurement part 14A has a body surface sensor 20A that measures the temperature of the body surface 4A and a middle sensor 24 that measures the temperature of the interface 22A between the heat insulating part 18 and the first heat releasing control part 18A.

The temperature measurement part 14B has a body surface sensor 20B that measures the temperature of the body surface 4A and a middle sensor 24 that measures the temperature of the interface 22B between the heat insulating part 18 and the second heat releasing control part 18B.

The temperature measurement part 14C has an external air sensor 25A that measures the temperature of the contact surface 23A of the heat insulating part 18 with the external air and an outer middle sensor 44A that measures the temperature of the interface 46A of the first heat releasing control part 18A and the heat insulating part 18.

The temperature measurement part 14D has an external air sensor 25B that measures the temperature of the contact surface 23B of the heat insulating part 18 with external air and an outer middle sensor 44B that measures the temperature of the interface 46B of the second heat releasing control part 18B and the heat insulating part 18. The rest of the configuration is the same as in Working Example 1.

The temperature measurement parts 14A, 14B, 14C, and 14D pertaining to this embodiment are simply arranged horizontally. In this embodiment, the surface area of the temperature gauge body 70 is divided into four in accordance with the number of temperature measurement parts. The vertical length of the temperature gauge body 70 is divided in two in accordance with the number of heat insulating materials in each temperature measurement part. The number of sensors in each temperature measurement part is 4.

Working Example 4

In this working example, the measurement results obtained using the temperature gauge body 70 will be described.

The measurement conditions described below are used in this working example. The temperature measurement part 14A has, layered from the side of the body surface 4A, a silicone material heat insulating part 18 with a heat transfer coefficient of 0.05 (W/mK) and a first heat releasing control part 18A with a heat transfer coefficient of 0.01 (W/mK). The temperature measurement part 14B has, layered from the side of the body surface 4A, a silicone material heat insulating part 18 with a heat transfer coefficient of 0.05 (W/mK) and a second heat releasing control part 18B with a heat transfer coefficient of 0.02 (W/mK). The temperature measurement part 14C has, layered from the side of the body surface 4A, a first heat releasing control part 18A with a heat transfer coefficient of 0.01 (W/mK), and a silicone material heat insulating part 18 with a heat transfer coefficient of 0.05 (W/mK). The temperature measurement part 14D has, layered from the side of the body surface 4A, a second heat releasing control part 18B with a heat transfer coefficient of 0.02 (W/mK), and a silicone material heat insulating part 18 with a heat transfer coefficient of 0.05 (W/mK). The thickness of each is 2 mm. The remainder of the measurement conditions are the same as in Working Example 1.

In this working example, as shown in FIG. 8, the body surface sensors 20A, 20B are positioned at 0 mm from the body surface 4A, and the middle sensors 24A, 24B are positioned 2 mm from the body surface 4A. The outer middle sensors 44A, 44B are positioned 2 mm from the body surface 4A, and the external air sensors 25A, 25B are positioned 4 mm from the body surface 4A.

Of the measurement results for the respective sensors, the deep body temperature Tcore is computed by substituting the first body surface temperature T1, the first reference temperature T2, the second body surface temperature T3, and the second reference temperature T4 into formula (3). In addition, the external air temperature Tout is computed by substituting the first external air temperature T5, the first external reference temperature T7, the second external air temperature T6, and the second external reference temperature T8 into formula (9). As a result, the deep body temperature Tcore has an error of −0.18686 for a set value of 36.81314. In addition, the external air temperature Tout has an error of −0.02948 for a set value of 24.97052.

Fifth Embodiment

Figure 9:
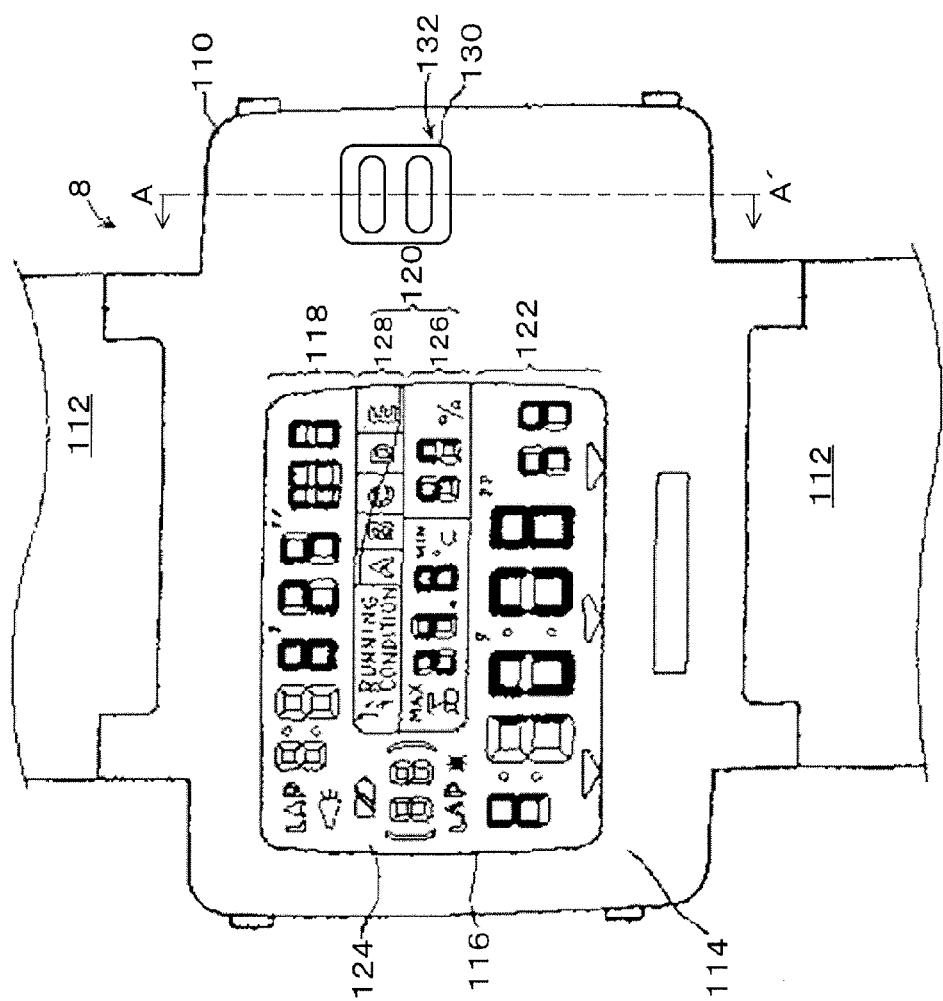
FIG. 9 is an enlarged plan view of the essential components of the wrist-mounted temperature gauge device of the fifth embodiment.
Figure 10:
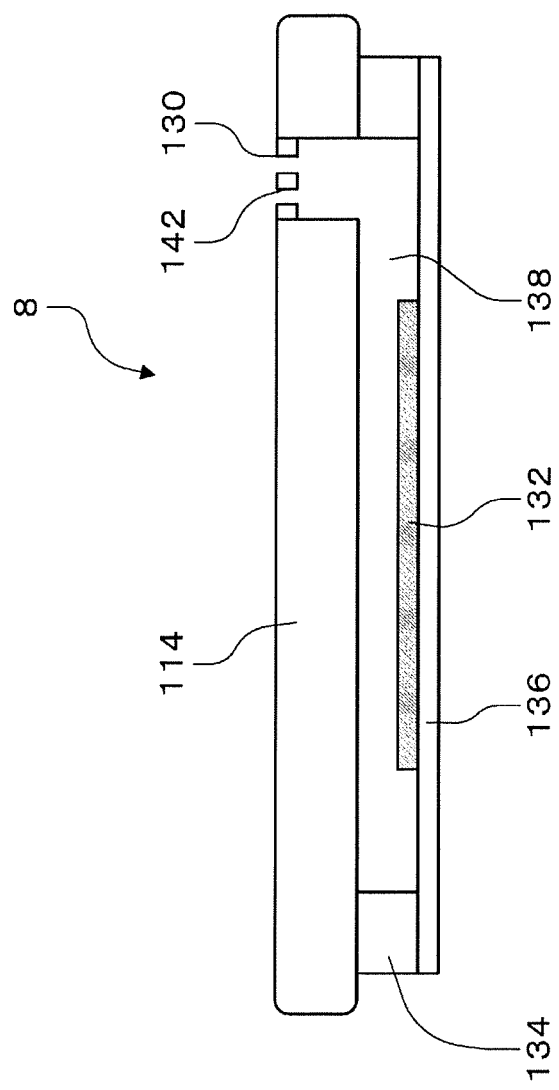
FIG. 10 is an A-A' sectional view of FIG. 9.

FIG. 9 is an enlarged plan view of the essential components of a wrist-mounted temperature gauge measurement device used as the temperature measurement device in this embodiment. FIG. 10 is an A-A' sectional view of FIG. 9.

The wrist-mounted temperature gauge measurement device 8 of this embodiment, as shown in FIG. 9, includes a device main body 110 as the display device with a flat, roughly square shape measuring 31.5 mm×29.0 mm and a wrist band 112 that is linked to both sides thereof. The device main body 110 has a case 114 composed of various materials such as plastic or metal, with a square window provided in the case 114 in order to form a display part 116 in a region that is slightly inclined in the 9 o-clock direction of the wristwatch. In the case 114, the dimension in the vertical direction where the wrist band 112 is linked (the dimension running from 12 o'clock to 6 o'clock on a wristwatch) is shorter than the dimension in the transverse direction (dimension from 3 o'clock to 9 o'clock on a wristwatch). The wrist-mounted temperature measurement device 8 thus has improved feel when worn on the wrist.

The display part 116, as a whole, includes a liquid crystal display panel 124 having display regions 118, 120, and 122 as three levels. Because the case 114 is elongated transversely, a wide-angle panel is used for the liquid crystal display panel 124. In addition, an EL back-light function is provided in the liquid crystal display panel 124.

The wrist-mounted temperature measurement device 8 has a time function similar to common watches or stopwatches, and in the condition shown in FIG. 9, the display part 116 has an upper level display region 118 that displays that the date is Monday, August 25. The lower level display region 122 displays that the present time is 10:08 pm, 59 sec. Display in the lower display region 122 is carried out using large segments of a common stopwatch arrangement having a vertical dimension of about 4.7 mm. The middle display region 120 is divided into an upper and lower level, with the lower level display region 126 displaying that the temperature is 24.8° C. In the middle level display region 120, the upper display region 128 displays the current conditions in terms of ranks A to E indicating ease of running based on temperature.

Temperature Gauge Body Arrangement

With the wrist-mounted temperature measurement device 8 in this embodiment, the case 114 is elongated transversely, and a temperature gauge body 132 that is covered with a temperature-sensitive cap 130 is disposed on the 3 o'clock side of the wristwatch. When a transversely elongated case 114 is used, and the temperature gauge body 132 is disposed on the 3 o'clock side in this manner, the cuff of the user's clothing will not cover the temperature gauge body when the wrist-mounted temperature measurement device 8 is worn on the wrist. There is thus the advantage that measurement can be carried out with high precision.

The case 114, as shown in FIG. 10, is constituted by a trunk portion 134 corresponding to the main body portion and a back cover 136 that is attached to the back surface thereof. The back cover 136 of the case 114 constitutes a temperature gauge body disposition space 138, where this temperature gauge body disposition space 138 is formed on the interior of the case 114. A temperature-sensitive cap 130 covers the case 114 on the surface thereof. This temperature-sensitive cap 130 is provided with a hole 142 for external air intake and release in the region corresponding to the temperature gauge body disposal space 138. For this reason, external air can enter into and exit from the temperature gauge body disposition space 138 through the hole 142 of the temperature-sensitive cap 130. For this reason, the temperature gauge body 132 is always in contact with fresh external air and can readily respond to changes in external air temperature. Disposition of the temperature gauge body 132 requires contact with the body surface 4A of the body 4 for measurement of deep temperature, and thus disposition is carried out via the back cover 136 or the like, not the upper part of the case 114.

Although an example of a wristwatch-form device was described in the above embodiment, the invention can be adapted to the measurement of both deep temperature and external air temperature. The invention is suitable for industrial applications such as the measurement of deep temperature in furnaces or pipelines and the measurement of deep temperature in engine rooms, as well as the measurement of external air temperature in such cases.

What is claimed is:

1. A temperature measurement device comprising:
   a first surface temperature measurement part subjected to measure, as a first surface temperature, a surface temperature of a subject to be measured;
   a first reference temperature measurement part subjected to measure, as a first reference temperature, the temperature at a position having a predetermined heat resistance value relative to the measurement position of the first surface temperature and having a first heat resistance value relative to external air;
   a second surface temperature measurement part subjected to measure a second surface temperature at a surface position that is different from the first surface temperature measurement position;
   a second reference temperature measurement part subjected to measure, as a second reference temperature, the temperature at a position having a predetermined heat resistance value relative to the measurement position of the second surface temperature and having a second heat resistance value different from the first heat resistance value relative to external air;
   a deep-part temperature computation part subjected to compute a deep-part temperature of the subject to be measured using the first surface temperature, the first reference temperature, the second surface temperature, and the second reference temperature values;
   a heat insulating part having the shared predetermined heat resistance value being provided between the first surface temperature measurement position and the first reference temperature measurement position and between the second surface temperature measurement position and the second reference temperature measurement position;
   a first heat releasing control part having the first heat resistance value being provided between the first reference temperature measurement position and external air; and
   a second heat releasing control part having the second heat resistance value being provided between the second reference temperature measurement position and the external air;
   the temperature measurement device being configured so that the surface of the first heat releasing control part where contact is made with the external air and the surface of the second heat releasing control part where contact is made with the external air have equivalent predetermined heat transfer coefficients.

2. The temperature measurement device according to claim 1, further comprising
   a display device having a display part subjected to display the deep-part temperature computed by the deep-part temperature computation part; and
   a temperature gauge body having the first surface temperature measurement part, the second surface temperature measurement part, the first reference temperature measurement part, and the second reference temperature measurement part, wherein
   the display device and the temperature gauge body are configured as separate entities.

* * * * *